Nov. 1, 1966  W. B. McDOWELL  3,281,947
CONSTANT BUBBLE INDICATOR
Filed June 21, 1963

INVENTOR
William B. McDowell
BY
ATTORNEYS

United States Patent Office 3,281,947
Patented Nov. 1, 1966

3,281,947
CONSTANT BUBBLE INDICATOR
William B. McDowell, 845 6th St., Boulder, Colo.
Filed June 21, 1963, Ser. No. 289,553
3 Claims. (Cl. 33—212)

This invention relates to mensuration equipment and more particularly to bubble level tubes.

In many types of mensuration equipment a movable member is used to actuate an indicating mechanism and a bubble level tube may be used to indicate actual movement of the arm. Level vials (bubble level tubes) may, also, be used on paving machines, asphalt laying machines, and other types of machines in which the angle of tilt or levelness must be known. By using calibrated scales with the level vials the force or the amount of movement may be measured by the pivotal movement of the level tube. These bubble level tubes are elongated tubes filled with liquid leaving a small air or gas space as a bubble. However, in each instance the bubble size in the tube is predetermined by the manufacturer which to date must be of a large size and no means have been available to control the size of the bubble. The large size bubble must "read" at both ends in relation to the scale to estimate the position of the bubble, and these end readings must be averaged for an approximation of the bubble position.

According to the present invention I have provided a liquid filled indicating tube which is arranged to provide a size adjustment for the bubble included therein, and means for permitting expansion or contraction of the liquid to control the size of the bubble. The liquid filled tube of the invention is provided with an expansion member, and in one particular form, expansion is provided by a bellows which controls pressure internally of the tube. Means are provided for changing the size of the bubble in a particular form.

Included among the objects and advantages of the present invention is a level vial of a transparent, liquid filled tube having a small void therein for an indicating bubble, an expansion means connected with the tube permits expansion and contraction of the liquid in the tube for controlling the size of the bubble and prevents breaking of the tube by expansion of the liquid. Means are provided for adjusting the pressure in the tube changing the size of the bubble where desired and to provide for a uniform size of bubble. In one form of the invention an air, gas or vapor reservoir is provided for the tube for control of the indicating bubble under the conditions of use.

These and other objects and advantages of the present invention may be readily ascertained by referring to the following description and appended illustrations in which.

Figure 2:
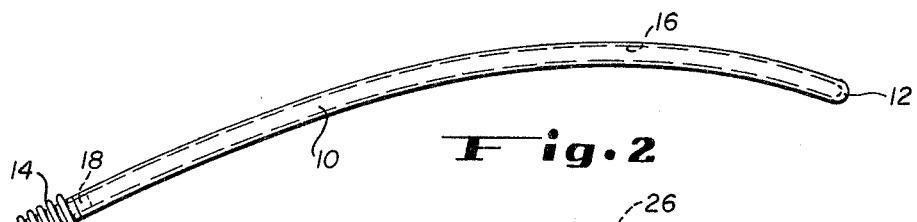
FIG. 2 is a side-elevational view of a bubble tube according to the invention with a single bellows.

In one form of the invention selected for an illustration, a bubble tube, FIG. 2, includes a hollow tube 10, which may be made of transparent glass, transparent plastic or the like, having a closed end 12 and a bellows 14 secured at the other end. The tube is liquid tight and is filled with a liquid and a small gas bubble 16. The liquid may be a non-freezing mixture for the temperature conditions under which it operates, and the gas may be air or other gas which is not absorbed in the liquid. The configuration of the curve of tube, as shown, is non-circular, that is, it has a changing radius of curvature from one end to the other. This is to provide means for using an arithmetical scale for the position of the bubble, since in general the actuating arm of a mensuration device does not move in an arithmetical straight line motion per unit of force moving such an arm, as explained below. When used as an angle measurer, the tube may have a circular curve. The bellows 14 may be made of metal, glass, rubber or a plastic of usual bellows form, balloon form or other form filled with the liquid in the tube which provides means for permitting expansion and contraction of the liquid which is sealed within the tube. In some instances the bellows may be filled with the gas of the bubble and by manipulating the bellows gas may be added or removed from the bubble 16 so as to provide a change in the size of the bubble. The bellows 14 is sealed to the tube by means of neck 18 on the bellows which may be sealed internally of the tube 10. The attachment of the neck 18 to the tube may be by any convenient means as by adhesive, cement, or the like. With the bellows, expansion or contraction of the liquid is accommodated creating a proper temperature-pressure relationship internally of the tube to maintain a uniform size of bubble. This permits the use of a small bubble which may be read directly from its center in relation to the scale.

Figure 3:
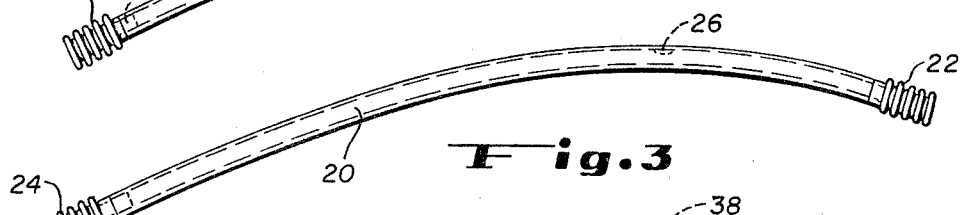
FIG. 3 is a side-elevational view of a modified bubble tube with a bellows on each end thereof for adjusting the bubble contained in the level vial.

A modified tube is shown in FIG. 3 wherein a tube 20 has a bellows 22 and 24 at each end thereof. A bubble of gas 26 is sealed in the tube. The device of FIG. 3 having the two bellows provides for a larger expansion in the volume of the liquid without greatly increasing the overall size of the tube and bellows. The bellows at one end may be used to adjust the spring tension of the bellows at the opposite end of the tube.

Figure 4:
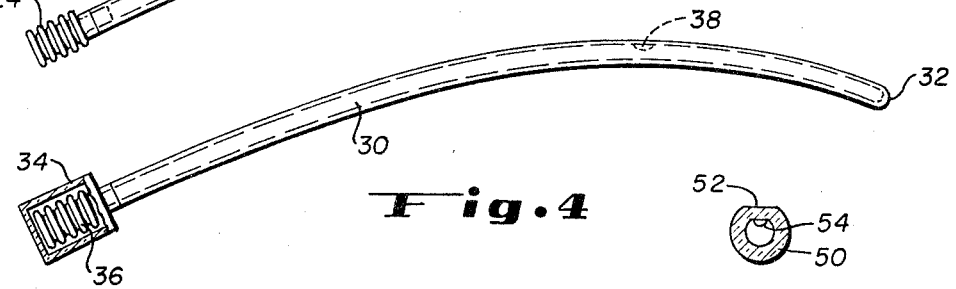
FIG. 4 is a detail of a modified bubble level tube with an enclosed bellows mechanism for automatically controlling the expansion and contraction of liquid in the tube.

The modification of FIG. 4 provides a tube 30 with a closed end 32 and an enlarged, bulbous closed end 34. The end 34 may be an integral part of the tube, of the same material, or may be a separate part sealed to the tube. In either case it provides an enlarged chamber for a gas filled bellows 36 contained therein. The bellows containing a gas is sealed and it floats in the liquid in the tube and in chamber 34. A bubble 38 is provided in the tube in a manner similar to the other bubble tubes. The bellows provides a large volume, usually a gas, to allow expansion or contraction of the liquid so that the size of the bubble is not affected to any great extent. This modification simplifies the sealing of a bellows of a different material in the system, particularly, for example, where a metal bellows is used with a glass tube. Also, the pressure in the bellows may be controlled to provide a balanced system in providing expansion and contraction, the liquid and maintaining the desired size of bubble. The bellows may contain a liquid of different expansion-contraction characteristics, which may be a mixture of two or more different liquids. Also, a low vapor pressure liquid may be used to provide different characteristics at different temperature, which may include the use of two immiscible liquids having different vapor pressures, thus providing different characterstics at different temperature.

Figure 5:
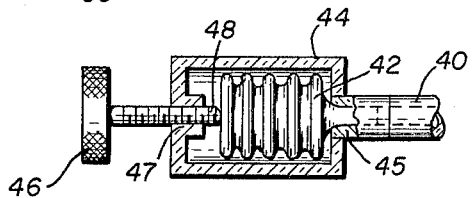
FIG. 5 is a side-elevational view, partially cut away, of a manually controlled bellows for an end of a level vial for manually controlling the pressure in the tube and thereby controlling the size of the bubble contained therein.

A manual control for the bellows may be provided as shown in FIG. 5 wherein a tube 40 is provided with a bellows 42 which is sealed to one end of tube 40. The opposite end of the tube is provided with a non-controlled bellows (similar to FIG. 3). A frame 44 mounted on the tube encloses the bellows. The bellows is sealed to the interior of the tube by any convenient means, and the frame may be likewise sealed to the tube 40 by any means. The frame as shown is a tubular member sealed to the tube at 45 to hold the bellows in alignment. A thumb screw 46, threadedly engaged in an opening and internal boss 47, provides means for moving the screw 48 toward and away from the bellows for varying the pressure on liquid, thereby changing the size of a bubble in the tube 40. The bellows which is not controllable permits automatic expansion and contraction within the controlled pressure environment.

Figure 6:
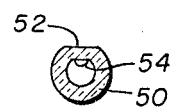
FIG. 6 is a cross-sectional view of a modified bubble tube having a flattened side for a bubble therein.

A modified configuration of a bubble tube is illustrated in FIG. 6 wherein a tubular member 50 has its topside 52 flattened providing a flat surface for a bubble 54 in the tube. The flat outer surface permits a scale to be made on the tube itself. The length of the tube is preferably made flat, however, in the area of maximum and minimum scale is satisfactory for the flattening.

Figure 7:
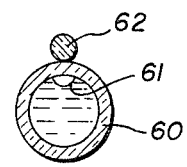
FIG. 7 is a modified level tube, in cross section.

The modification of FIG. 7 includes a bubble tube or level vial 60, which may be made of glass, plastic or the like, and is transparent for observation of the bubble retained in the tube. The tube is made curved, as explained above, either with a circular curve or a non-circular curve depending on the use. The tube is filled with liquid as explained with the other modifications, having a bubble 61 therein. A transparent glass or plastic rod 62, having the same curvature as the tube 60, is mounted on the top of the tube by clips or other convenient fastening means. A scale may be affixed to the rod 62 or to the tube 60. The rod may, also, be fuzed to the tube to securely affix it thereto. With the rod on top of the tube, the bubble viewed through the rod appears as a line lateral to the longitudinal axis of the rod. This permits a very accurate reading of the "bubble" with no estimation necessary to determine the position of the middle of the bubble.

Figure 8:
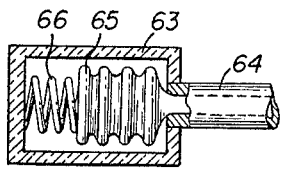
FIG. 8 is a detail of a modified level tube illustrating a spring loaded bellows.

In FIG. 8 a chamber 63 is secured to a tube 64. A bellows 65 enclosed in the chamber 63 is in liquid communication with the liquid in the tube. A spring 66 is biased against the bellows to aid its movement on contraction of the liquid due to temperature changes. The bellows may be free as shown in FIG. 4 or connected to the tube as shown in FIG. 8.

As pointed out above, a bubble tube may be used for various types of mensuration equipment wherein a moving member is used to actuate an indicating member. The bubble tube takes the place of the normal indicator found in most measuring instruments. Other uses such as a level, angular measuring device, etc. may use a tube with a circular curvature, that is, on a radius of a circle. The bellows, however, permits control of bubble size. In all cases the bellows permits the use of a small, uniform size bubble which may be "read" on the scale in its center, rather than centering or "reading" the bubble between two marks of the scale.

Figure 1:
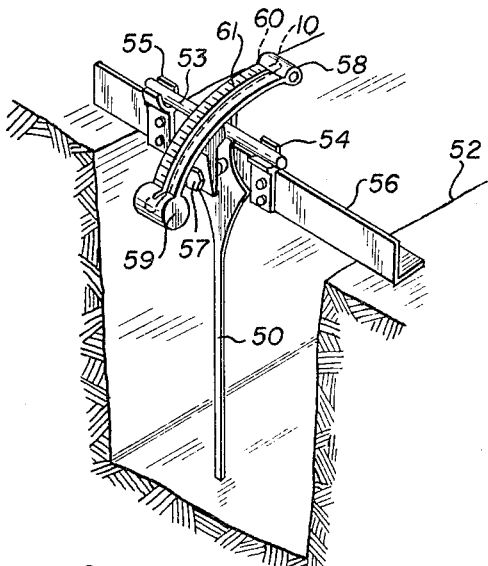
FIG. 1 illustrates one type of mensuration device for use with a bubble tube according to the invention.

One use of a bubble tube is illustrated in FIG. 1 wherein a pendant flow measuring vane 50 is mounted in a ditch or flume 52 for measuring the flow of water therein. The pendant vane is pivotally mounted on a pivot bar 53 which is mounted in fulcrum brackets 54 and 55 secured to an angle 56 mounted across the ditch. An adjusting screw 57 provides means for "zeroing" the pendant vane when mounted in a ditch without flowing water. A bubble tube carrier 58 is mounted on the pendant vane and arranged to pivot therewith. A bubble tube such as any of those shown in FIGS. 2, 3 and 4 may be mounted in the carrier, such as, for example, mounting the tube 10 of FIG. 2 in the carrier. The carrier is provided with an enlarged end 59 for enclosing the bellows 14 to the tube 10 and it may be counterbalanced by means of bulbous end 60 at the opposite end of the carrier. As shown, a linear scale 61 is etched or otherwise imprinted on the carrier, and the bubble of the tube marks the position of the tube in relation to the pendant vane.

For use of a pendant vane such as shown in FIG. 1, a calibrated cross-section ditch or channel must be provided at the position of the vane and preferably the ditch bottom should be fairly level at about the point of measuring. The scale on the bubble tube carrier is predetermined by calibrating the vane in relation to a standard section of the ditch, as by measuring the actual volume of water flowing through the standard cross section in relation to the depth of water on the vane and the bubble position on the scale. The stream flow acting on the pendant vane 50 causes it to swing downstream pivoting the tube. The bubble, therefore, moves along the tube. The tube for such a device is arranged so that at zero set the bubble is in the area of minimum curvature. The vane swings downstream under the influence of the flow of water and the bubble moves toward the maximum curvature of the tube. The tube is made thusly since the initial flow pivots the pendant vane through a smaller angle per increment of flow than at the maximum flow rates. By having the tube of a varying radius of curvature, the initial movement of the pendant vane causes larger increments of movement of the bubble. As the flow increases there is an increased movement of the pendant vane per increment of flow and the decreased radius of curvature causes the bubble to move the same amount per increment of flow. In this manner the scale on the tube carrier can be an arithmetical scale.

As bubble levels are to be used out-of-doors, particularly in flow meters, hot asphalt machines and the like, the bellows provides a means for accommodating expansion or contraction of the liquid therein so that the bubble itself remains generally or approximately the same size. In reading the position of a small bubble on the scale it is easy to read the middle of the bubble in relation to the scale rather than to attempt to extrapolate the scale in relation to an enlarged bubble between two lines of the scale. The accuracy of the level is therefore greatly enhanced by maintaining a small bubble of approximately the same size. Even under the extreme temperature variations of night and direct sun during the day, the size of the bubble will remain approximately the same. The bellows action may be enhanced by springs to aid or reduce the movement of the bellows on expansion or contraction. Also, a series of springs may be used to provide a differential action which may operate sequentially to provide a straight line action on expansion or contraction. Thus, liquids which vaporize or springs may be used to add or subtract to the bellows spring constant.

While the invention has been illustrated with respect to particular devices, there is no intent to limit the spirit or scope of the invention to the precise details so set forth except as defined in the following claims.

I claim:

1. A bubble tube comprising an elongated tubular member of transparent material, a bulbous member mounted on one end of said tubular member, sealed bellows means filled with a fluid mounted in said bulbous member, said bulbous member being in fluid communication with the interior of said tubular member, said tubular member being curved so as to confine a bubble to a single locale at any operable position of said tubular member, liquid essentially filling said tubular member leaving a small bubble in said tubular member and filling the space around said bellows means, said fluid in said bellows being different than the liquid in said tubular member, and said bellows means arranged to accommodate expansion and contraction of said filling liquid so as to maintain a substantially uniform size of bubble.

2. A bubble tube according to claim 1 wherein said bellows contains at least two immiscible liquids, each having a different boiling point so as to differentially affect the bellows spring constant on temperature changes.

3. A bubble tube according to claim 1 wherein at least one spring is mounted in position to provide a non-linear bellows spring constant on movement thereof.

References Cited by the Examiner

UNITED STATES PATENTS

| 363,998 | 5/1887 | Evelyn | 33—212 |
|---|---|---|---|
| 1,902,387 | 3/1933 | Von Hofe et al. | 33—211 |
| 2,179,773 | 11/1939 | Young | 73—371 |
| 2,551,792 | 5/1951 | de Giers et al. | 73—290.5 |
| 2,736,501 | 2/1956 | Widell | 73—368.7 X |
| 2,896,453 | 7/1959 | Ryan et al. | 33—212 X |

FOREIGN PATENTS

| 180,841 | 6/1922 | Great Britain. |
|---|---|---|
| 629,518 | 9/1949 | Great Britain. |

LEONARD FORMAN, *Primary Examiner.*

WILLIAM D. MARTIN, JR., *Assistant Examiner.*